US011956227B2

United States Patent
Yanagi

(10) Patent No.: US 11,956,227 B2
(45) Date of Patent: Apr. 9, 2024

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE FOR CHANGING A PASSWORD

(71) Applicant: BROTHER KOGYO KABUSHIKI KAISHA, Nagoya (JP)

(72) Inventor: Satoru Yanagi, Obu (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 313 days.

(21) Appl. No.: 17/457,083

(22) Filed: Dec. 1, 2021

(65) Prior Publication Data
US 2022/0174055 A1    Jun. 2, 2022

(30) Foreign Application Priority Data
Dec. 2, 2020    (JP) .................................. 2020-200526

(51) Int. Cl.
*H04L 9/40*    (2022.01)
(52) U.S. Cl.
CPC .......... *H04L 63/083* (2013.01); *H04L 63/123* (2013.01)
(58) Field of Classification Search
CPC ............................ H04L 63/083; H04L 63/123
USPC ............................................................ 726/7
See application file for complete search history.

(56) References Cited

U.S. PATENT DOCUMENTS

| | | | | |
|---|---|---|---|---|
| 7,770,122 B1* | 8/2010 | Shaik | ................... | G06F 16/958 |
| | | | | 715/744 |
| 10,846,385 B1* | 11/2020 | Walters | ................... | G06F 21/40 |
| 2008/0114771 A1* | 5/2008 | Welingkar | .......... | H04L 41/0846 |
| 2008/0115152 A1* | 5/2008 | Welingkar | .............. | G06F 16/27 |
| | | | | 719/322 |
| 2011/0191838 A1* | 8/2011 | Yanagihara | ............. | G06F 21/00 |
| | | | | 726/26 |
| 2018/0115427 A1* | 4/2018 | Dequen | ................... | G06F 21/31 |
| 2020/0076798 A1* | 3/2020 | Lidsky | .................. | H04L 9/3228 |
| 2020/0380115 A1* | 12/2020 | Knight | .................... | G06F 21/46 |

(Continued)

FOREIGN PATENT DOCUMENTS

JP    2010-198505 A    9/2010

*Primary Examiner* — Thanh T Le
(74) *Attorney, Agent, or Firm* — Scully, Scott, Murphy & Presser, PC

(57) ABSTRACT

A communication device may obtain email information inputted by a user, the email information including an email address and server information for using a mail server. The communication device may send a first email by using the server information included in the email information. The communication device may register a first password and the email information in a memory in a case where a registration request is received from a terminal device which has received the first email. The communication device may send a second email by using the server information in the memory in a case where a first change instruction is obtained after the first password and the email information have been registered. The communication device may change the first password in the memory to a second password in a case where a change request is received from the terminal device.

14 Claims, 5 Drawing Sheets

(56) References Cited

U.S. PATENT DOCUMENTS

2021/0036977 A1\* 2/2021 Everton ................ H04L 51/212
2021/0092102 A1\* 3/2021 Hathaway ........... H04L 63/0428

\* cited by examiner

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD PERFORMED BY COMMUNICATION DEVICE FOR CHANGING A PASSWORD

CROSS-REFERENCE TO RELATED APPLICATIONS

This application claims priority to Japanese Patent Application No. 2020-200526, filed on Dec. 2, 2020, the entire contents of which are incorporated herein by reference.

BACKGROUND

A service that uses an email address and a password as account information exists. If a user forgets the password, a server providing such a service sends an email to the email address of the user, for example. The email includes a Uniform Resource Locator (URL) for changing the password. When the user receives the e-mail in his/her own terminal, he/she sets a new password by clicking the URL in the email and accessing the server.

The above service assumes that the server is capable of sending emails. That is, information for using a mail server (e.g., an address of the mail server) is set in advance in this server. In recent years, a user password is registered in home appliances such as printers, and password authentication is often executed. In such types of home appliances, information for sending emails is not registered in advance. Due to this, if the user forgets the password in the state where this information is not registered, he/she cannot set a new password using the aforementioned method that utilizes the email.

SUMMARY

The disclosure herein discloses art that allows for suitably changing a password when a user forgets the password.

A communication device disclosed herein may comprise: a memory; and a controller. The controller may be configured to: obtain email information inputted by a user, the email information including an email address and server information for using a mail server; in a case where the email information is obtained, send a first email by using the server information included in the email information, the first email including as a recipient address the email address included in the email information, and also including a body in which first location information in the communication device is described; receive a registration request including the first location information from a terminal device which has received the first email; in a case where the registration request is received from the terminal device, register a first password and the email information in the memory; obtain a first change instruction for changing the first password without the first password being inputted after the first password and the email information have been registered in the memory; in a case where the first change instruction is obtained, send a second email by using the server information in the memory, the second email including as a recipient address the email address included in the memory, and also including a body in which second location information in the communication device is described; receive a change request including the second location information from the terminal device which has received the second email; and in a case where the change request is received from the terminal device, change the first password in the memory to a second password.

The present disclosure discloses technique that allows a user to suitably change a password when the user forgets the password.

A computer program for the aforementioned communication device, a computer-readable medium storing the computer program and a method performed by the aforementioned communication device are also novel and useful.

Figure 1:
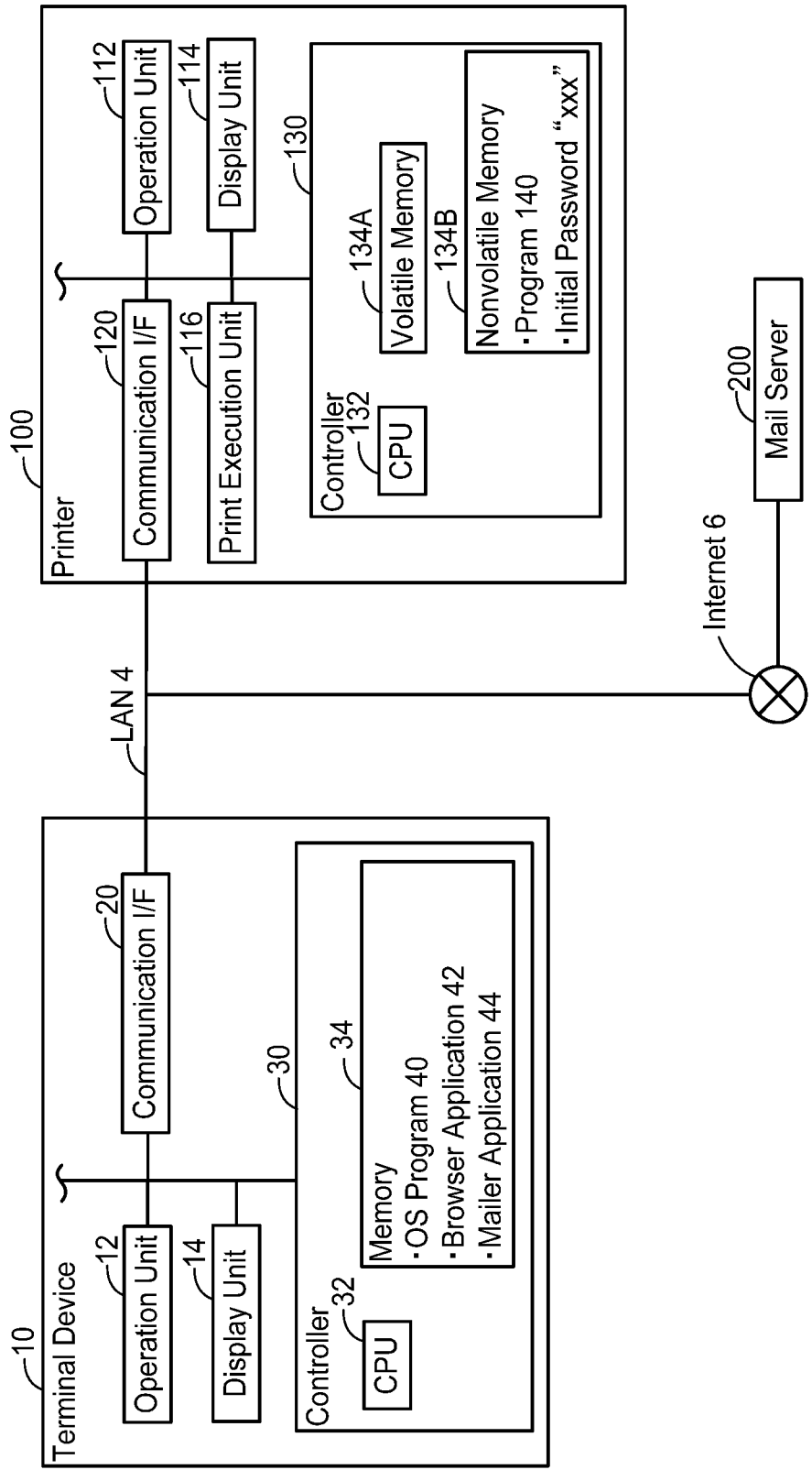
FIG. 1 shows a configuration of a communication system.

DETAILED DESCRIPTION (Configuration of Communication System 2: FIG. 1)

As shown in FIG. 1, a communication system 2 comprises a terminal device 10, a printer 100, and a mail server 200. The terminal device 10 and the printer 100 are connected to a Local Area Network (LAN) 4 and are configured to communicate with each other through the LAN 4. The LAN 4 is connected to the Internet 6, and the mail server 200 is established on the Internet 6. Due to this, the terminal device 10 and the printer 100 are configured to execute communication with the mail server 200 through the Internet 6. The mail server 200 is a server for mediating email communication. Hereinbelow, the terminal device 10 will be termed "terminal 10" for simpler expression.

(Configuration of Terminal 10)

The terminal 10 may be a portable terminal such as a smartphone, a notebook PC, and a tablet PC, or may be a stationary terminal such as a desktop PC. The terminal 10 is a terminal owned by an administrator who manages the printer 100. The terminal 10 comprises an operation unit 12, a display unit 14, a communication interface 20, and a controller 30.

The operation unit 12 is buttons or a touch screen to be operated by a user. The display unit 14 is a display configured to display various types of information. The communication interface 20 is connected to the LAN 4. The controller 30 comprises a CPU 32 and a memory 34. The CPU 32 is configured to execute various processes according to programs 40 to 44 stored in the memory 34. The memory 34 is configured of volatile memory, a nonvolatile memory, and the like.

An OS program 40 is a program for implementing basic operations of the terminal 10. A browser application 42 is a program for implementing webpage browser. A mailer application 44 is a program for implementing email communication and display thereof. Hereinbelow, the OS program 40, the browser application 42, and the mailer application 44 will respectively be termed "OS 40", "browser 42", and "mailer 44" for simpler expressions.

(Configuration of Printer 100)

The printer 100 is a peripheral device configured to execute a print function (i.e., a peripheral device of the terminal 10). The printer 100 may be a multi-function peripheral configured to execute a scan function and a facsimile function in addition to the print function. The printer 100 comprises an operation unit 112, a display unit 114, a print execution unit 116, a communication interface 120, and a controller 130.

The operation unit 112 is buttons or a touch screen to be operated by the user. The display unit 114 is a display configured to display various types of information. The print execution unit 116 is a print mechanism of an inkjet scheme, a laser scheme, or the like. The communication interface 120 is connected to the LAN 4. The controller 130 comprises a CPU 132, a volatile memory 134A, and a nonvolatile memory 134B. The CPU 132 is configured to execute various processes according to a program 140 stored in the nonvolatile memory 134B. At the time of shipment of the printer 100, a default password "xxx" for executing user authentication is registered in advance in the nonvolatile memory 134B.

Figure 2:
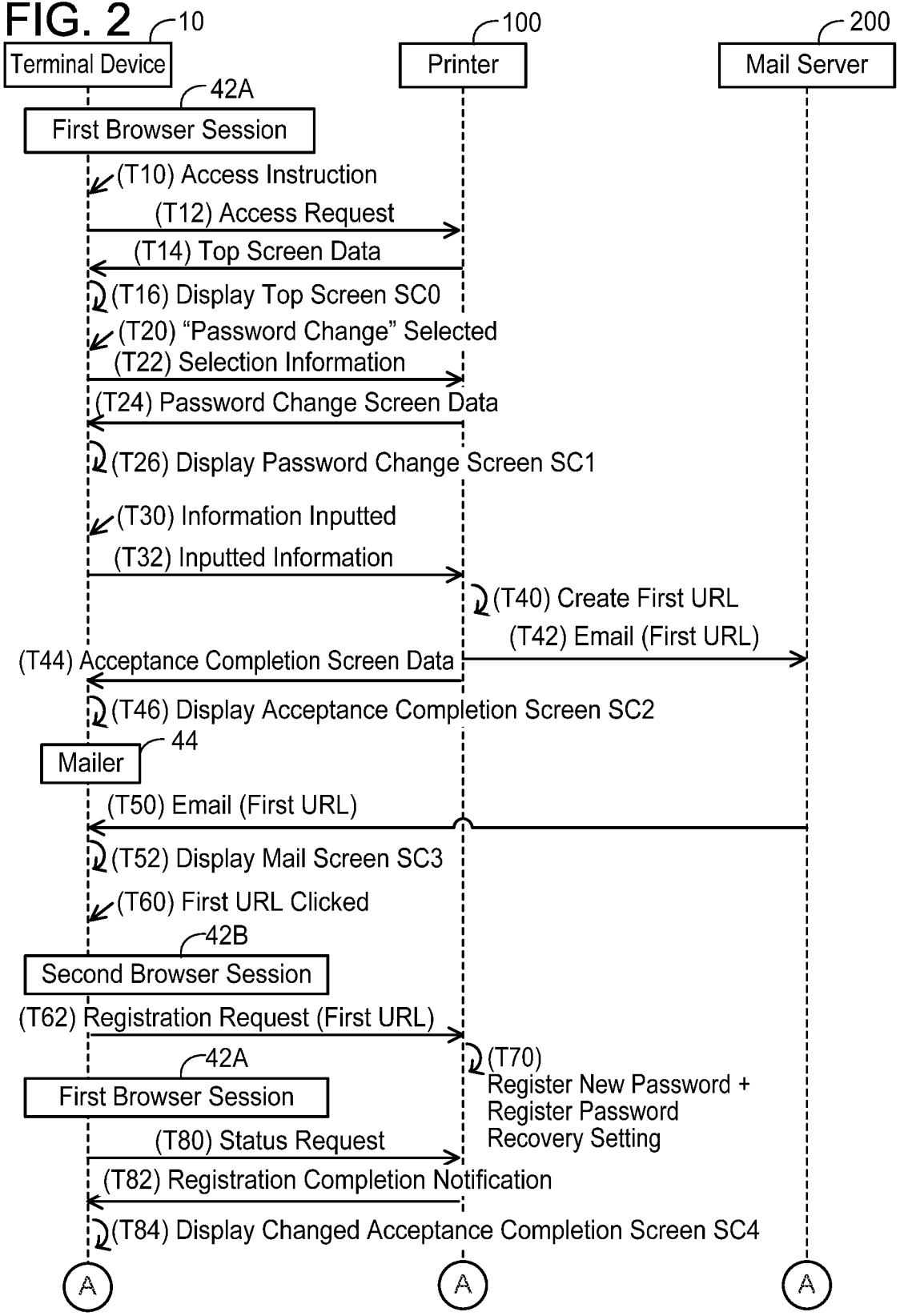
FIG. 2 shows a sequence diagram of a process executed by respective devices.

(Process Executed by Respective Devices 10, 100, 200: FIG. 2)

Next, a process executed by the respective devices 10, 100, 200 will be described with reference to FIG. 2. The following contemplates a situation in which, after the printer 100 has been shipped, the administrator accesses the printer 100 using the terminal 10 without the default password "xxx" of the printer 100 being changed. Further, an email address for the printer 100 to send and receive emails (i.e., an email address of the printer 100) is set in advance in the printer 100. However, neither server information for using the mail server 200 nor an email address of the terminal 10 is registered in the printer 100 yet.

Hereinbelow, in explaining contents of the processes executed by the CPU 32 of the terminal 10, the explanation may be given with the browser 42 or the mailer 44 that executes the processes as a subject of action rather than explaining the CPU 32 as subject of action. Especially in the present embodiment, a plurality of sessions of the browser 42 is simultaneously activated, thus in explaining the contents of the processes executed by the browser 42, the explanation may be given with the browser sessions that execute the processes as the subjects of action. Here, one browser session is a session that displays one window. That is, in the state where two windows are displayed by the browser 42, for example, two browser sessions are activated.

When an operation for activating the browser 42 is performed by the administrator on the terminal 10, a first browser session 42A is activated in the terminal 10. When the first browser session 42A accepts an instruction for accessing a web server function of the printer 100 (i.e., an input of a Uniform Resource Locator (URL) of a web server in the printer 100) in T10, the first browser session 42A sends an access request to the printer 100 in T12.

When the CPU 132 of the printer 100 receives the access request from the terminal 10 in T12, the CPU 132 of the printer 100 sends top screen data representing a top screen SC0 to the terminal 10 in T14.

Figure 4:
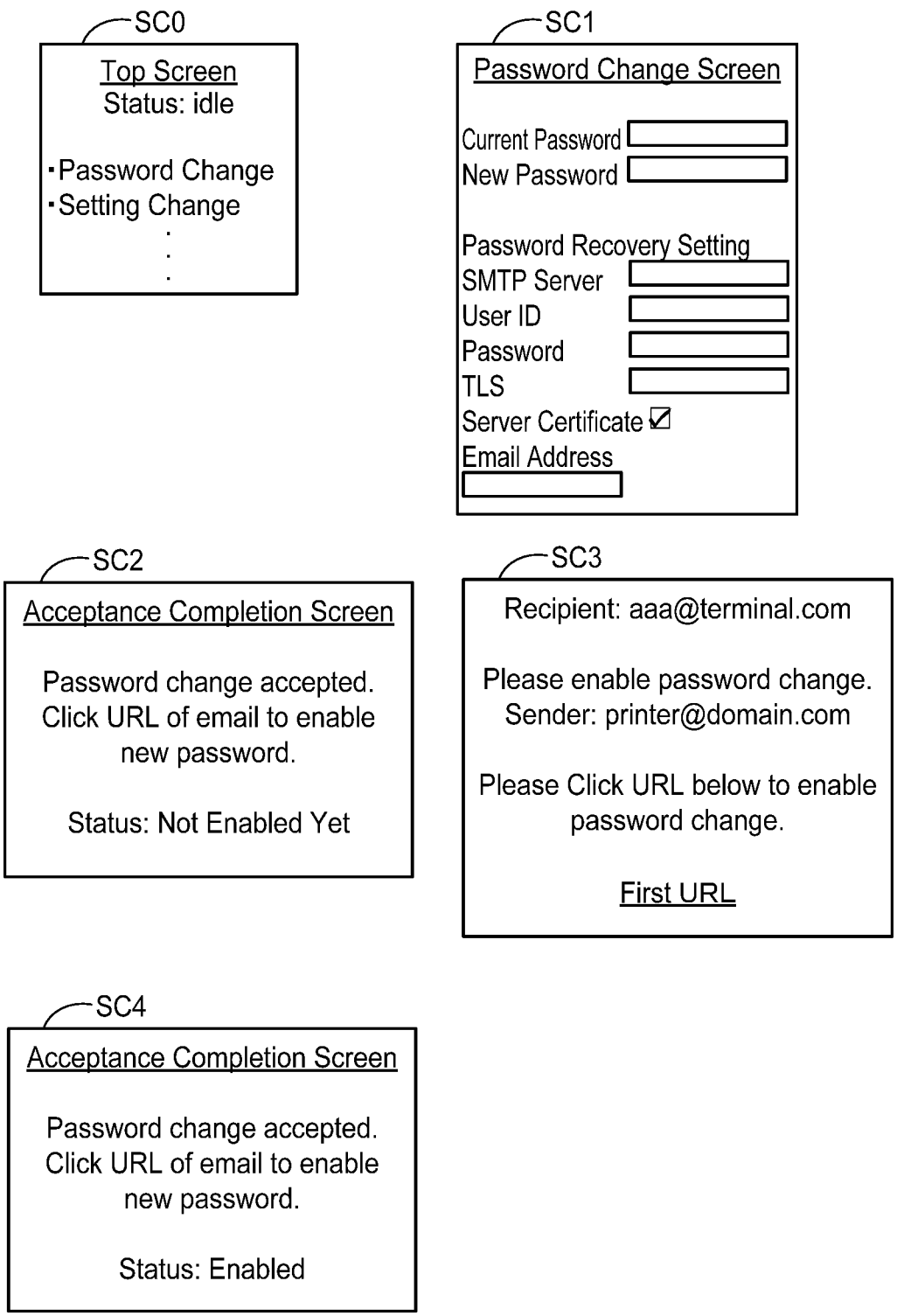
FIG. 4 shows examples of respective screens.

When the first browser session 42A receives the top screen data from the printer 100 in T14, the first browser session 42A displays the top screen SC0 in T16. As shown in FIG. 4, the top screen SC0 includes a current status of the printer 100 ("idle" in the example of FIG. 4) and a plurality of buttons for changing settings of the printer 100 (e.g., a "password change" button).

In T20, the first browser session 42A accepts selection of the "password change" button in the top screen SC0. In this case, in T22, the first browser session 42A sends the printer 100 selection information indicating that the "password change" button has been selected.

When the CPU 132 of the printer 100 receives the selection information from the terminal 10 in T22, the CPU 132 of the printer 100 sends to the terminal 10 password change screen data representing a password change screen SC1 in T24. Due to this, the printer 100 can suitably obtain respective pieces of information inputted to the password change screen SC1 by the administrator (i.e., server information for using the mail server 200, an email address of the administrator, and a new password). Here, since the new password is inputted by the administrator, the administrator can input a password that is easy for him/her to remember as the new password. Especially, the printer 100 provides the administrator with the password change screen SC1, which is a single screen for inputting all of the information. Due to this, as compared to a configuration that requires the administrator to input the respective pieces of information in different screens, convenience for the administrator can be improved.

When the first browser session 42A receives the password change screen data from the printer 100 in T24, the first browser session 42A displays the password change screen SC1 in T26. As shown in FIG. 4, the password change screen SC1 includes an input box for inputting a current password (i.e., the default password "xxx") and an input box for inputting the new password.

The password change screen SC1 further includes a plurality of input boxes for inputting password recovery settings. The password recovery settings are settings for registering the new password when the administrator forgets the current password, and specifically include the server information for using the mail server 200 and the email address of the administrator (i.e., an email address of the terminal 10 set in the terminal 10). The plurality of input boxes as above includes an input box for inputting an address of a Simple Mail Transfer Protocol (SMTP) server, an input box for inputting a user ID to be authenticated by the mail server 200, an input box for inputting a password to be authenticated by the mail server 200, an input box for inputting information for Transport Layer Security (TLS), and a check box indicating whether to use a server certificate. These pieces of information inputted to these input boxes are the server information. Further, the plurality of input boxes as above further includes an input box for inputting the email address of the administrator.

In T30, the first browser session 42A accepts input of the respective pieces of information in the password change screen SC1. For example, since the default password "xxx" of the printer 100 may be described in a user manual of the printer 100, the administrator inputs the default password "xxx" as the current password. The administrator further inputs a password which he/she can easily remember as the new password. The administrator further inputs respective pieces of information related to the mail server 200 which is available to the administrator (e.g., the address of the SMTP server). The administrator further inputs the email address for the mailer 44 of the terminal 10 to send and receive emails (i.e., email address of the terminal 10). When the first browser session 42A accepts the input of the respective pieces of information (hereinbelow termed "inputted information") in T30, the first browser session 42A sends the inputted information to the printer 100 in T32.

When the CPU 132 of the printer 100 receives the inputted information from the terminal 10 in T32, the CPU 132 of the printer 100 creates a first URL in T40. The first URL is a URL including a domain of the printer 100, that is, a URL indicating a location within the printer 100. Although details will be described later, the first URL is a URL used in authentication for registering the new password as a replacement to the current password.

Next, in T42, the CPU 132 of the printer 100 sends an email to the mail server 200 by using the inputted information received in T32. Specifically, the CPU 132 sends an email including the respective pieces of information within the inputted information as follows, namely the address of the SMTP server, the user ID, the password, the information on TLS, and the server certificate. The email further includes the email address in the inputted information as its recipient address and a body in which the first URL created in T40 is described.

When the inputted information is correct information, the mail server 200 can receive the email from the printer 100 in T42. When the inputted information is incorrect information, for example, when the address of the SMTP server is incorrect, the mail server 200 cannot receive the email from the printer 100.

When the CPU 132 of the printer 100 sends the email in T42, the CPU 132 of the printer 100 sends to the terminal 10 acceptance completion screen data representing an acceptance completion screen SC2 in T44.

When the first browser session 42A receives the acceptance completion screen data from the printer 100 in T44, the first browser session 42A displays the acceptance completion screen SC2 in T46. As shown in FIG. 4, the acceptance completion screen SC2 includes a message indicating that password change has been accepted, a message prompting to click the first URL in the email, and a message indicating a status showing whether the password change has been completed. Here, the status indicates that the password change has not yet been completed. Due to this, the administrator can acknowledge that he/she should click the URL in the email.

The mailer 44 of the terminal 10 receives an email from the mail server 200 in T50. When an operation to display this email is performed by the administrator, the mailer 44 displays a mail screen SC3 in T52. As shown in FIG. 4, the email address set in the mailer 44 is described as the recipient address in the mail screen SC3. Further, a body of the mail screen SC3 includes a message prompting to enable the password change and the email address of the printer 100 being a sender of the email. The body of the mail screen SC3 further includes a message prompting to click the first URL and the first URL to which a hyperlink is set.

When the mailer 44 accepts an operation of clicking the first URL in the mail screen SC3 in T60, the mailer 44 notifies the OS 40 of the first URL. As a result of this, a second browser session 42B different from the first browser session 42A is activated by the OS 40, and the second browser session 42B is notified of the first URL by the OS 40.

In T62, the second browser session 42B sends to the printer 100 a registration request including the first URL notified of by the OS 40 as a destination URL.

When the CPU 132 of the printer 100 receives the registration request from the terminal 10 in T62, the CPU 132 of the printer 100 determines that the first URL is a URL created in T40. That is, the CPU 132 determines that authentication of the URL was successful. In this case, in T70, the CPU 132 registers the new password received in T32 as a replacement to the default password "xxx" in the nonvolatile memory 134B. The CPU 132 further registers the password recovery settings received in T32 in the nonvolatile memory 134B. Due to this, the printer 100 can resend the email for changing the password by using the password recovery settings if the administrator should ever forget the new password.

After having displayed the acceptance completion screen SC2 in T46, the first browser session 42A repeats sending a status request (e.g., see T80) to the printer 100. The status request is a request for inquiring whether the password change has been completed.

After registration of the new password and the password recovery settings is completed (see T70), the CPU 132 of the printer 100 receives the status request from the terminal 10 in T80. In this case, the CPU 132 sends to the terminal 10 a registration completion notification in T82.

When the first browser session 42A receives the registration completion notification from the printer 100 in T82, the first browser session 42A changes the acceptance completion screen SC2 in T84. Specifically, the first browser session 42A changes the message indicating that the password change has not yet been completed to a message indicating that the password change has been completed as the status included in the acceptance completion screen SC2. Due to this, an acceptance completion screen SC4 after the change is displayed. As shown in FIG. 4, the acceptance completion screen SC4 after the change includes the message indicating that the password change has been completed. Due to this, the administrator can acknowledge that the password change has been completed.

Figure 5:
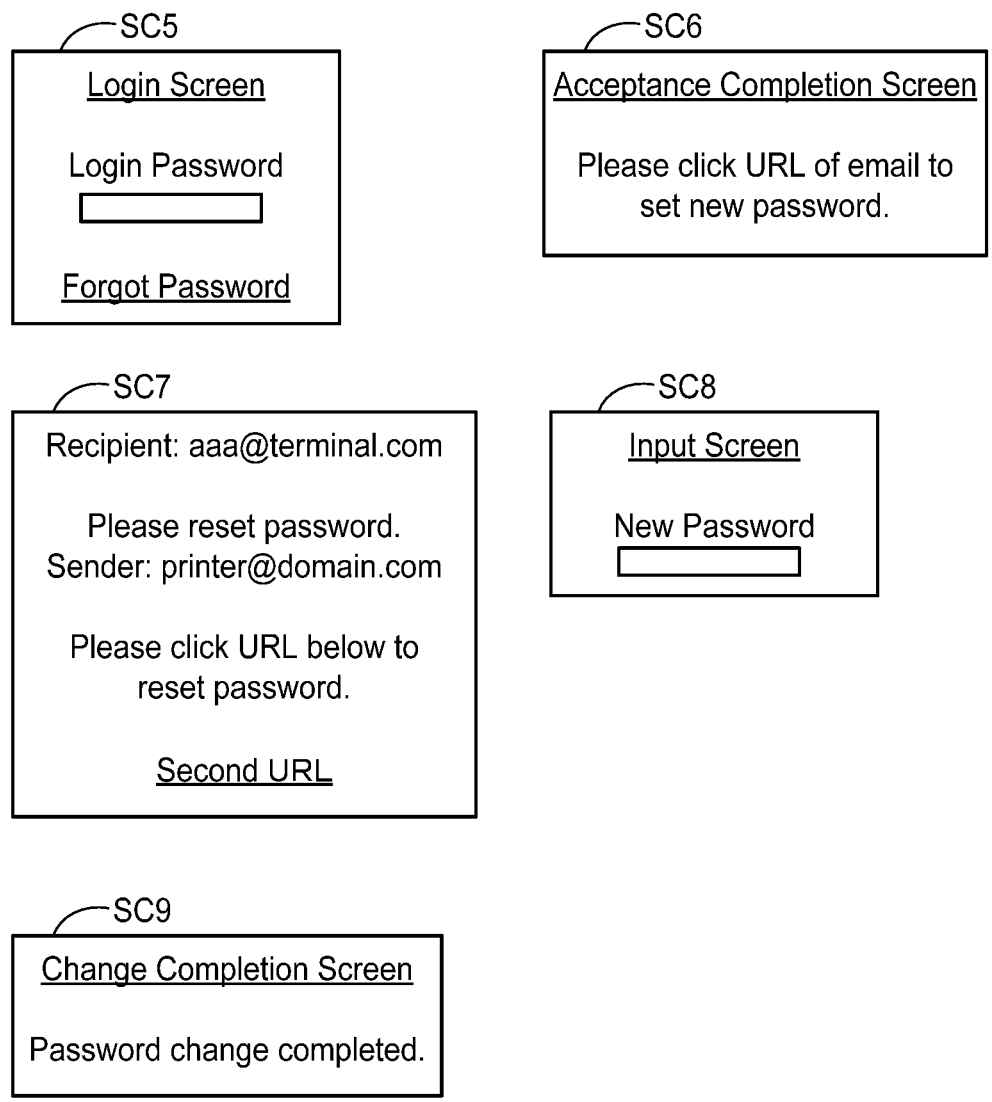
FIG. 5 shows examples of respective screens.

After the password change is completed, the administrator selects a "setting change" button in the top screen SC0, and inputs the password registered in T70 in a login screen for inputting a password (see SC5 in FIG. 5 to be described later). In this case, the administrator can change various settings of the printer 100 (e.g., communication setting, default print setting).

Figure 3:
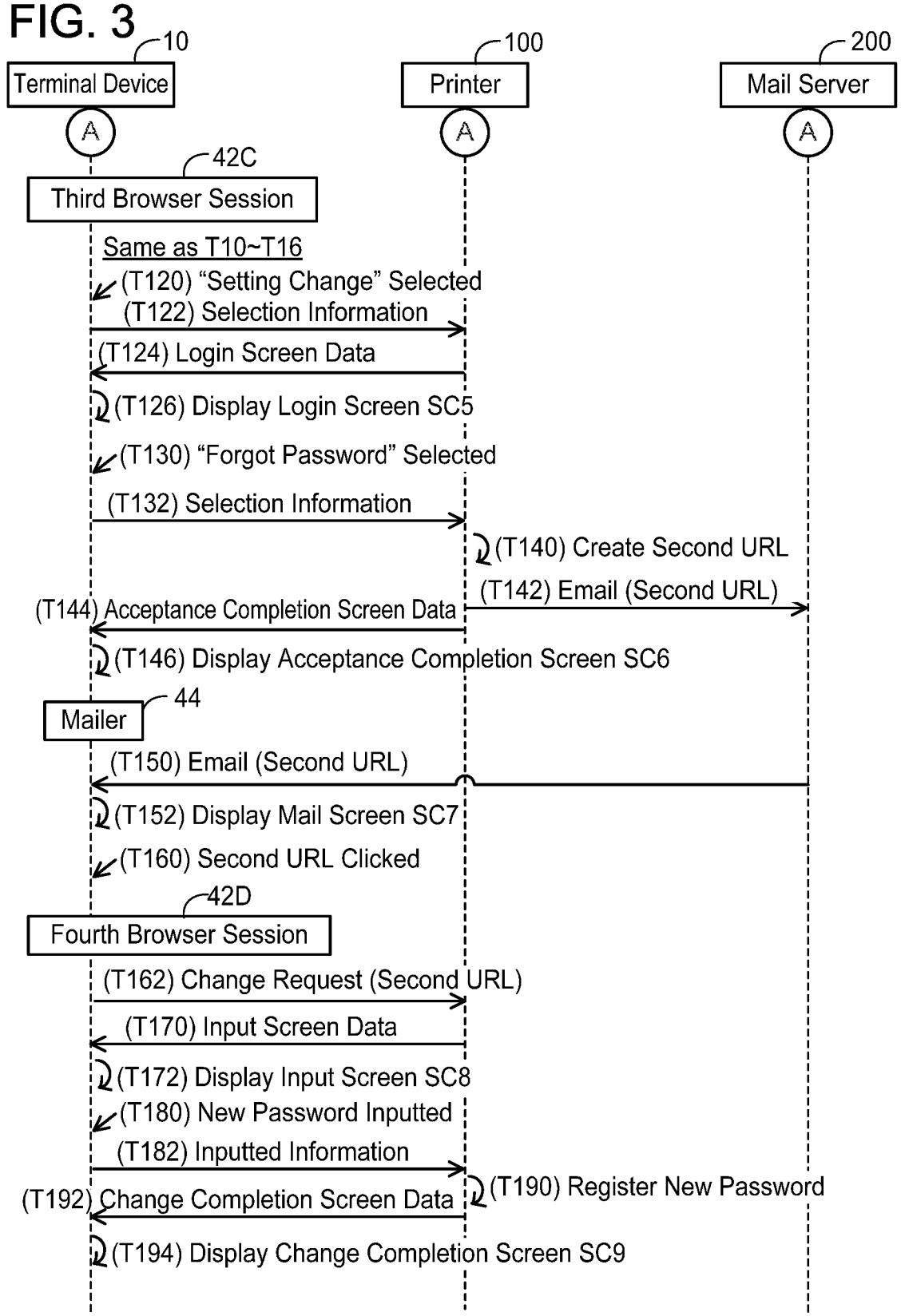
FIG. 3 shows a sequence diagram continued from FIG. 2.

(Continuation of FIG. 2: FIG. 3)

Next, a case in which the administrator forgets the password registered in T70 of FIG. 2 will be described with reference to FIG. 3. When the operation for activating the browser 42 is performed by the administrator on the terminal 10, a third browser session 42C is activated in the terminal 10. After this, the same operations and processes as T10 to T16 of FIG. 2 are executed.

In T120, the third browser session 42C accepts selection of the "setting change" button in the top screen SC0. In this case, in T122, the third browser session 42C sends to the printer 100 selection information indicating that the "setting change" button has been selected.

When the CPU 132 of the printer 100 receives the selection information from the terminal 10 in T122, the CPU 132 of the printer 100 sends to the terminal 10 login screen data representing a login screen SC5 in T124.

When the third browser session 42C receives the login screen data from the printer 100 in T124, the third browser session 42C displays the login screen SC5 in T126. As shown in FIG. 5, the login screen SC5 includes an input box for inputting a password and a message indicating that the user forgot the password. This message is hyperlinked to a URL to request the password change.

In T130, the third browser session 42C accepts selection of the message indicating that the password is forgotten in the login screen SC5. In this case, in T132, the third browser session 42C sends to the printer 100 selection information indicating that this message has been selected. This selection information includes the URL to which the message is hyperlinked as its destination URL.

In T132, the CPU 132 of the printer 100 receives the selection information from the terminal 10. As above, when the message in the login screen SC5 is selected, the printer 100 can suitably obtain an instruction for changing the password by receiving the selection information from the terminal 10.

Next, in T140, the CPU 132 creates a second URL. The second URL is a URL indicating a location within the printer 100 and is different from the aforementioned first URL. In a variant, the second URL may be the same as the first URL. Although details will be described later, the second URL is a URL used in authentication for registering the new password as a replacement to the current password (i.e., the password registered in T70 of FIG. 2).

Next, in T142, the CPU 132 of the printer 100 sends an email by using the password recovery settings (i.e., the address of the SMTP server) registered in the nonvolatile memory 134B in T70 of FIG. 2. The email further includes the email address in the password recovery settings (i.e., the email address of the terminal 10) as its recipient address and includes a body in which the second URL created in T140 is described.

When the CPU 132 of the printer 100 sends the email in T142, the CPU 132 of the printer 100 sends to the terminal 10 acceptance completion screen data representing an acceptance completion screen SC6 in T144.

When the third browser session 42C receives the acceptance completion screen data from the printer 100 in T144, the third browser session 42C displays the acceptance completion screen SC6 in T146. As shown in FIG. 5, the acceptance completion screen SC6 includes a message prompting to click the second URL in the email. Due to this, the administrator can acknowledge that he/she should click the URL in the email.

In T150, the mailer 44 of the terminal 10 receives an email from the mail server 200. When an operation to display this email is performed by the administrator, the mailer 44 displays a mail screen SC7 in T152. As shown in FIG. 5, in the mail screen SC7, the email address set in the mailer 44 is described as the recipient address. Further, a body of the mail screen SC7 includes a message prompting to reset the password and the email address of the printer 100 being a sender of the email. The body of the mail screen SC7 further includes a message prompting to click the second URL and the second URL to which a hyperlink is set.

When the mailer 44 accepts an operation of clicking the second URL in the mail screen SC7 in T160, the mailer 44 notifies the OS 40 of the second URL. As a result of this, a fourth browser session 42D different from the third browser session 42C is activated by the OS 40, and the fourth browser session 42D is notified of the second URL by the OS 40.

In T162, the fourth browser session 42D sends to the printer 100 a change request including the second URL notified of by the OS 40 as a destination URL.

When the CPU 132 of the printer 100 receives the change request from the terminal 10 in T162, the CPU 132 of the printer 100 determines that the second URL is the URL created in T140. That is, the CPU 132 determines that authentication of the URL was successful. In this case, in T170, the CPU 132 sends the terminal 10 input screen data representing an input screen SC8. Due to this, the printer 100 can suitably obtain a new password to be inputted to the input screen SC8 by the administrator. Here, since the new password is inputted by the administrator, the administrator can input a password which he/she can easily remember as the new password.

When the fourth browser session 42D receives the input screen data from the printer 100 in T170, the fourth browser session 42D displays the input screen SC8 in T172. As shown in FIG. 5, the input screen SC8 includes an input box for inputting the new password.

In T180, the fourth browser session 42D accepts input of the new password to the input screen SC8. In this case, the fourth browser session 42D sends to the printer 100 the new password in T182.

When the CPU 132 of the printer 100 receives the new password from the terminal 10 in T182, the CPU 132 of the printer 100 registers the new password in the nonvolatile memory 134B in T190 as a replacement to the current password.

After registration of the new password is completed, the CPU 132 of the printer 100 sends to the terminal 10 change completion screen data representing a change completion screen SC9 in T192.

When the fourth browser session 42D receives the change completion screen data from the printer 100 in T192, the fourth browser session 42D of the terminal 10 displays the change completion screen SC9 in T194. The change completion screen SC9 includes a message indicating that the password change has been completed. Due to this, the administrator can acknowledge that the password change has been completed.

Effects of Present Embodiment

According to the present embodiment, prior to registering the new password as the replacement to the default password "xxx", the printer 100 sends the email (T42 of FIG. 2) using the password recovery settings inputted by the administrator. Then, the printer 100 registers the new password and the password recovery settings (T70) in the case where the printer 100 receives the registration request from the terminal 10 that has received the aforementioned email (T62). That is, even if the administrator forgets the new password, the printer 100 registers the new password and the password recovery settings when an environment in which the email for changing this new password to another password can be sent to the terminal 10 is prepared. As such, the printer 100 can suitably send the email to the terminal 10 (T142) when it obtains the instruction for changing the password (T132 of FIG. 3) without input of the password registered in T70. Further, the printer 100 can change this password to another password (T190) when it receives the change request from the terminal 10 that has received the email (T162). As above, the printer 100 can suitably change the current password to another password (T190) when the administrator forgets the current password.

(Corresponding Relationship)

The printer 100 is an example of "communication device". The password change screen data in T24 of FIG. 2 and the password change screen SC1 in FIG. 4 are respectively an example of "first input screen data" and "first input screen". The email in T42 of FIG. 2 and the first URL included in this email are respectively an example of "first email" and "first location information". The registration request in T62 is an example of "registration request". The password registered in T70 is an example of "first password".

The selection information in T132 of FIG. 3 is an example of "first change instruction". The email of T142 and the second URL included in this email are respectively an example of "second email" and "second location information". The change request in T162 is an example of "change request". The password registered in T190 is an example of "second password". The default password "xxx" is an example of "third password". The login screen data in T124 of FIG. 3 and the login screen SC5 in FIG. 5 are respectively an example of "second input screen data" and "second input screen". The message "forgot password" in the login screen SC5 is an example of "predetermined area". The input screen data in T170 and the input screen SC8 in FIG. 5 are respectively an example of "third input screen data" and "third input screen".

The process of T24, the process of T42, the process of T44, the process of T62, the process of T70, and the process of T82 in FIG. 2 are respectively an example of "send to the terminal device first input screen data", "send a first email", "notify that the first password has not been registered yet", "receive a registration request", "register a first password and the email information", and "notify that the first password has been registered". The process of T32 is an example of "obtain email information" and "obtain the first password".

The process of T124, the process of T132, the process of T142, the process of T162, the process of T170, the process of T182, and the process of T190 of FIG. 3 are respectively an example of "send to the terminal device second input screen data", "obtain a first change instruction", "send a second email", "receive a change request", "send to the terminal device third input screen data", "obtain the second password", and "change the first password".

(Variant 1) The printer 100 may obtain the server information and the email address by accepting an input operation by the administrator on the operation unit 112 instead of T10 to T32 of FIG. 2. In this variant, "send to the terminal device first input screen data" may be omitted.

(Variant 2) The printer 100 may obtain the new password by accepting an input operation by the administrator on the operation unit 112 instead of T10 to T32 of FIG. 2. In general terms, "obtain the first password" may not include receiving the first password from the terminal device. Further, in another variant, the printer 100 may create a new password without obtaining the password inputted by the administrator, and may provide the created new password to the administrator. In this variant, "obtain the first password" may be omitted.

(Variant 3) In T24 of FIG. 2, the printer 100 may send to the terminal device 10 the password change screen data representing the password change screen not including the input box for inputting the new password. In this case, the printer 100 may send screen data representing a screen for inputting the new password to the terminal 10 after having sent the email in T42 of FIG. 2, and may obtain the new password inputted by the administrator from the terminal device 10. In general terms, "obtain the first password" may obtain the first password after the first email has been sent.

(Variant 4) The printer 100 may not store the default password. In this case, in T24 of FIG. 2, the printer 100 sends to the terminal device 10 the password change screen data representing the password change screen not including the input box for inputting the current password. In general terms, the third password may not be registered in advance in the memory at the time of shipment of the communication device.

(Variant 5) The acceptance completion screens SC2 and SC4 in FIG. 4 may not include the message indicating the status. In this variant, "notify that the first password has not been registered yet" and "notify that the first password has been registered" may be omitted.

(Variant 6) The printer 100 may obtain the change instruction for changing the password by accepting a password change operation by the administrator on the operation unit 112 instead of T124 to T132 of FIG. 3. In this variant, "send to the terminal device second input screen data" may be omitted.

(Variant 7) The printer 100 may obtain the new password by accepting an input operation by the administrator on the operation unit 112 instead of T170 to T182 of FIG. 3. In general terms, "obtain the second password" may not include receiving the second password from the terminal device. Further, in this variant, "send to the terminal device third input screen data" may be omitted. In another variant, the printer 100 may create a new password without obtaining the password inputted by the administrator, and provide the created new password to the user. In this variant, "obtain the second password" may be omitted.

(Variant 8) In the above embodiment, the respective processes of FIGS. 2 and 3 are executed by the CPU 132 of the printer 100 executing the program 140 (i.e., software). Instead of this, at least one of the processes may be executed by hardware such as a logic circuit.

What is claimed is:

1. A communication device comprising:
a memory; and
a controller,
wherein the controller is configured to:
obtain email information inputted by a user, the email information including an email address and server information for using a mail server;
in a case where the email information is obtained, send a first email by using the server information included in the email information, the first email including as a recipient address the email address included in the email information, and also including a body in which first location information in the communication device is described;
receive a registration request including the first location information from a terminal device which has received the first email;
in a case where the registration request is received from the terminal device, register a first password and the email information in the memory;
obtain a first change instruction for changing the first password without the first password being inputted after the first password and the email information have been registered in the memory;
in a case where the first change instruction is obtained, send a second email by using the server information in the memory, the second email including as a recipient address the email address registered in the memory, and also including a body in which second location information in the communication device is described;
receive a change request including the second location information from the terminal device which has received the second email, the terminal device which has received the second email being the same as the terminal device which has received the first email; and
in a case where the change request is received from the terminal device which has received the second email, change the first password in the memory to a second password.

2. The communication device as in claim 1, wherein the controller is further configured to:
send, to the terminal device, first input screen data representing a first input screen for inputting the email information,
wherein the controller is configured to obtain the email information by receiving the email information from the terminal device due to the email information being inputted by the user to the first input screen displayed on the terminal device.

3. The communication device as in claim 1, wherein the controller is further configured to:
obtain the first password inputted by the user.

4. The communication device as in claim 3, wherein the controller is configured to obtain the first password before the first email is sent.

5. The communication device as in claim 4, wherein the controller is further configured to:
send, to the terminal device, first input screen data representing a first input screen for inputting the first password and the email information,
wherein the controller is configured to obtain the first password by receiving the first password from the terminal device due to the first password and the email information being inputted by the user to the first input screen displayed on the terminal device, and
the controller is configured to obtain the email information by receiving the email information from the terminal device due to the first password and the email information being inputted by the user to the first input screen displayed on the terminal device.

6. The communication device as in claim 1, wherein
a third password is registered in the memory in advance at a time of shipment of the communication device, and
the controller is configured to obtain the email information after a second change instruction for changing the third password has been obtained in a state where the third password is registered in the memory.

7. The communication device as in claim 1, wherein the controller is further configured to:
notify that the first password has not been registered yet after the first email has been sent and before the registration request is received from the terminal device.

8. The communication device as in claim 7, wherein the controller is further configured to:
in a case where the first password is registered in the memory after it has been notified that the first password has not been registered yet, notify that the first password has been registered.

9. The communication device as in claim 1, wherein the controller is further configured to:
in a case where the first password is registered in the memory, notify that the first password has been registered.

10. The communication device as in claim 1, wherein the controller is further configured to:
send, to the terminal device, second input screen data representing a second input screen for inputting the first password after the first password has been registered in the memory,
wherein in a case where a predetermined area in the second input screen displayed on the terminal device is selected by the user without the first password being inputted by the user to the second input screen, the controller is configured to obtain the first change instruction by receiving the first change instruction from the terminal device.

11. The communication device as in claim 1, wherein the controller is further configured to:
obtain the second password inputted by the user.

12. The communication device as in claim 11, wherein the controller is further configured to:
in a case where the change request is received from the terminal device, send, to the terminal device, third input screen data representing a third input screen for inputting the second password,
wherein in a case where the second password is inputted by the user to the third input screen displayed on the terminal device, the controller is configured to obtain the second password by receiving the second password from the terminal device.

13. A non-transitory computer-readable recording medium storing computer-readable instructions for a communication device, wherein
the computer-readable instructions, when executed by a processor of the communication device, cause the communication device to:
obtain email information inputted by a user, the email information including an email address and server information for using a mail server;
in a case where the email information is obtained, send a first email by using the server information included in the email information, the first email including as a recipient address the email address included in the email information, and also including a body in which first location information in the communication device is described;
receive a registration request including the first location information from a terminal device which has received the first email;
in a case where the registration request is received from the terminal device, register a first password and the email information in a memory;
obtain a first change instruction for changing the first password without the first password being inputted after the first password and the email information have been registered in the memory;
in a case where the first change instruction is obtained, send a second email by using the server information in the memory, the second email including as a recipient address the email address registered in the memory, and also including a body in which second location information in the communication device is described;
receive a change request including the second location information from the terminal device which has received the second email, the terminal device which has received the second email being the same as the terminal device which has received the first email; and
in a case where the change request is received from the terminal device which has received the second email, change the first password in the memory to a second password.

14. A method performed by a communication device, the method comprising:
obtaining email information inputted by a user, the email information including an email address and server information for using a mail server;
in a case where the email information is obtained, sending a first email by using the server information included in the email information, the first email including as a recipient address the email address included in the email information, and also including a body in which first location information in the communication device is described;
receiving a registration request including the first location information from a terminal device which has received the first email;

in a case where the registration request is received from the terminal device, registering a first password and the email information in a memory;

obtaining a first change instruction for changing the first password without the first password being inputted after the first password and the email information have been registered in the memory;

in a case where the first change instruction is obtained, sending a second email by using the server information in the memory, the second email including as a recipient address the email address registered in the memory, and also including a body in which second location information in the communication device is described;

receiving a change request including the second location information from the terminal device which has received the second email, the terminal device which has received the second email being the same as the terminal device which has received the first email; and in a case where the change request is received from the terminal device which has received the second email, changing the first password in the memory to a second password.

\* \* \* \* \*